United States Patent [19]
Lynch

[11] Patent Number: 4,788,710
[45] Date of Patent: Nov. 29, 1988

[54] TELEPHONE LINE SELECTION AND ISOLATION METHOD AND APPARATUS

[75] Inventor: Daniel Lynch, Jackson, N.J.

[73] Assignee: Keptel, Inc., Tinton Falls, N.J.

[21] Appl. No.: 61,500

[22] Filed: Jun. 11, 1987

Related U.S. Application Data

[63] Continuation-in-part of Ser. No. 828,205, Feb. 10, 1986, Pat. No. 4,682,347.

[51] Int. Cl.⁴ ............................................. H04M 1/24
[52] U.S. Cl. .......................................... 379/29; 379/6
[58] Field of Search ................... 379/29, 6, 21, 22, 26, 379/399; 324/66

[56] References Cited

U.S. PATENT DOCUMENTS

3,711,661  1/1973  Garrett et al. ......................... 379/21

Primary Examiner—Stafford D. Schreyer
Attorney, Agent, or Firm—R. Gale Rhodes, Jr.

[57] ABSTRACT

Method and apparatus for selecting a single telephone line from among multiple line pairs at a location remote from the central office and isolating that line from the respective subscriber line to allow the performance of line tests on same. Line pairs are sampled sequentially for a short time interval to determine whether a signal is present within an initial detection band, that band having a range about ±100 hz of the test signal frequency. If a signal is found, the system shifts to a validation made to defect a signal within a range of about ±10 hz of the test signal frequency during a preselected long time interval. Upon finding a signal present at the end of the validation cycle, the system disconnects the selected line from its respective subscriber line and begins performing line tests to diagnose problems.

10 Claims, 6 Drawing Sheets

TELEPHONE LINE SELECTION AND ISOLATION METHOD AND APPARATUS

RELATED APPLICATION

This application is a continuation-in-part of application Ser. No. 828,205, filed Feb. 10, 1986, U.S. Pat. No. 4,682,347.

BACKGROUND OF THE INVENTION

This invention relates to the field of telephone equipment, and more particularly to the field of telephone test equipment.

The proliferation of subscriber-owned telephone equipment has raised a serious problem for telephone companies: in the event a subscriber reports a problem, the company will waste resources if it dispatches a service person to the subscriber location, only to learn that the problem originates in subscriber-owned equipment not provided by the company. Therefore, it would be highly advantageous for the telephone company to be able to determine quickly whether a reported problem arises in the telephone line or in the subscriber equipment.

The prior art gives little assistance to the telephone company in this situation. Most of the available art is directed to the situation in which a telephone installer needs to identify particular line pairs from among a plurality of lines, as when a service person in working on a multi-pair cable. In that situation, U.S. Pat. No. 3,427, 538, to Bohnenblust teaches an arrangement whereby a workman at a remote location could apply a probe to a selected cable pair; the central office would then apply a signal to each cable pair in sequence until the test tone was detected at the remote location. This apparatus verifies reception of the tone by comparing signals passed through a delay circuit, using a coincidence technique. A similar system is shown in U.S. Pat. No. 3,559,055, to Thompson, showing an arrangement whereby the test signal is validated by a pulse recurrence timer. Other approaches, including that a Collier, U.S. Pat. No. 3,628,138, which teaches identification of a particular line pair by employing a modulated Gaussian noise source on the line, all include the requirement that a service person be physically present at the subscriber location in order to practice the inventions.

Beerbaum, in U.S. Pat. No. 3,912,882, recognizes this problem and proposes a partial solution. That disclosure places an apparatus at the subscriber location, coupled to a single telephone line. When the central office desires to check a line, it transmits a tone on that line. The apparatus detects the tone and disconnects the customer terminal equipment so that the central office can perform a prescribed series of line tests. At the conclusion of the testing, the apparatus reconnects the subscriber equipment.

This teaching addresses the demonstrated need, but it does so inefficiently and expensively, it being limited to a single telephone line. Therefore, at a subscriber location having more than one line, such as the typical 25-line termination block, one such apparatus would be required for every line. Clearly, a need exists to utilize a single apparatus to service a plurality of lines. Moreover, Beerbaum's apparatus could not be adapted to a multi-line situation without serious disadvantage. This disclosure teaches that the check tone transmitted by the central office "must be in excess of about four seconds", and preferably is ten seconds. Therefore, the minimum time necessary to scan every line of a 25-pair termination block utilizing this apparatus would be 100 seconds, and preferably would be 250 seconds. This time is stated as being necessary in order to discriminate the check tone and other signals appearing on the line.

Thus, notwithstanding the gains made by the prior art, the industry remains in need of a method for identifying a particular telephone line from among a multi-pair grouping and isolating that line, efficiently and quickly.

SUMMARY OF THE DISCLOSURE

It is therefore an object of this invention to provide a method and apparatus for selecting a single telephone line from among a plurality of lines in a multi-pair grouping and to isolate that selected line from subscriber equipment in order to perform tests on same.

It is another purpose of this invention to perform such selection and isolation more rapidly than is possible using the teachings of the prior art.

A further purpose of the invention is to conduct such selection without the need for personnel to be present at the subscriber location. These and other objects are achieved in the present invention by employing the method and apparatus disclosed herein. The telephone company central office selects a line to be tested, and transmits a check tone, preferably at a frequency of 2713 hz., over that line. A selection and isolation module, located at the line termination point, is connected to each of the lines. Under microprocessor control, a given line is selected for scanning by inputting appropriate control signals to a multiplexer, and signals from this line are appropriately filtered to eliminate signals lying outside the general frequency of the check tone. In accordance with a frequency measuring approach, the selected line then is scanned for a short time interval, such as 25 ms. This check, having a bandpass accuracy of about $\pm 100$ hz., is sufficient to give an initial indication of the presence of a check tone on the selected line, but not sufficiently accurate to validate that selection. If a signal is detected within the short time interval, the control unit continues to monitor the selected line for a longer time interval, such as 0.5 seconds. This time interval is sufficient to give an accuracy well within $\pm 10$ hz. If the check tone is detected during this long period, the system continues monitoring for a succession of such long intervals, preferably six intervals. Presence of the detected signal during this succession of long intervals validates the presence of the check tone and indicates that the line being scanned is the line selected by the central office. At that point, the control unit disconnects the line from subscriber equipment and connects it to a tone generator located within the apparatus in order to send a succession of test tones to the central office, enabling evaluation of the line quality. The invention thus is capable of identifying a single line from a 25-line group in a maximum test period of 3.875 seconds as opposed to the minimum period available under the prior art of 100 seconds.

Pursuant to another embodiment of the invention, the detection and validation of the check tone on the selected line is performed by utilizing a period measuring method. Generally, in accordance with a period measuring approach, an incoming signal is detected and used to generate a gating signal for a fixed time of one period of the frequency of the incoming signal. The gating signal activates an oscilator to generate pulses at a preselected time base during the one period time interval of the gating signal and the number of pulses generated is counted by a counter. The number of pulses generated during the fixed time of one period of the frequency is inversely proportional to the frequency of the incoming signal. Accordingly, the frequency of the incoming signal is determinable from the number of pulses accumulated in the counter. The accuracy of the period measuring approach is a function of the number of signal periods used to gate on and off the time base pulse generation. It has been found, for example, that the use of 10 periods of frequency of the industry standard 2713 hz check tone to gate on and off an 80 $\mu$ sec. time base oscilator will result in a pulse count indicative of the check tone frequency within a bandpass accuracy of approximately ±100 hz. Thus, the initial indication of the presence of a check tone on the selected line is achieved in the alternative embodiment by gating on and off a time base pulse generator for 10 periods of the check tone frequency. The validation of the check tone is performed by using the period measuring approach for a greater number of periods, e.g. 100, to increase the measuring resolution and, therefore, improve the accuracy of the pulse count so as to be indicative of the check tone frequency within a bandpass accuracy of approximately ±20 hz. An important advantage of the alternative period measuring method of the invention is that the test period to sequentially scan a plurality of telephone lines and to verify the presence of the check tone on the particular telephone line selected by the telephone company central office is reduced considerably, as will appear. The period measuring embodiment is therefore advantageous in certain applications where considerably more lines are to be scanned then in the typical 25-line termination block.

DETAILED DESCRIPTION OF PREFERRED EMBODIMENTS

Figure 1:
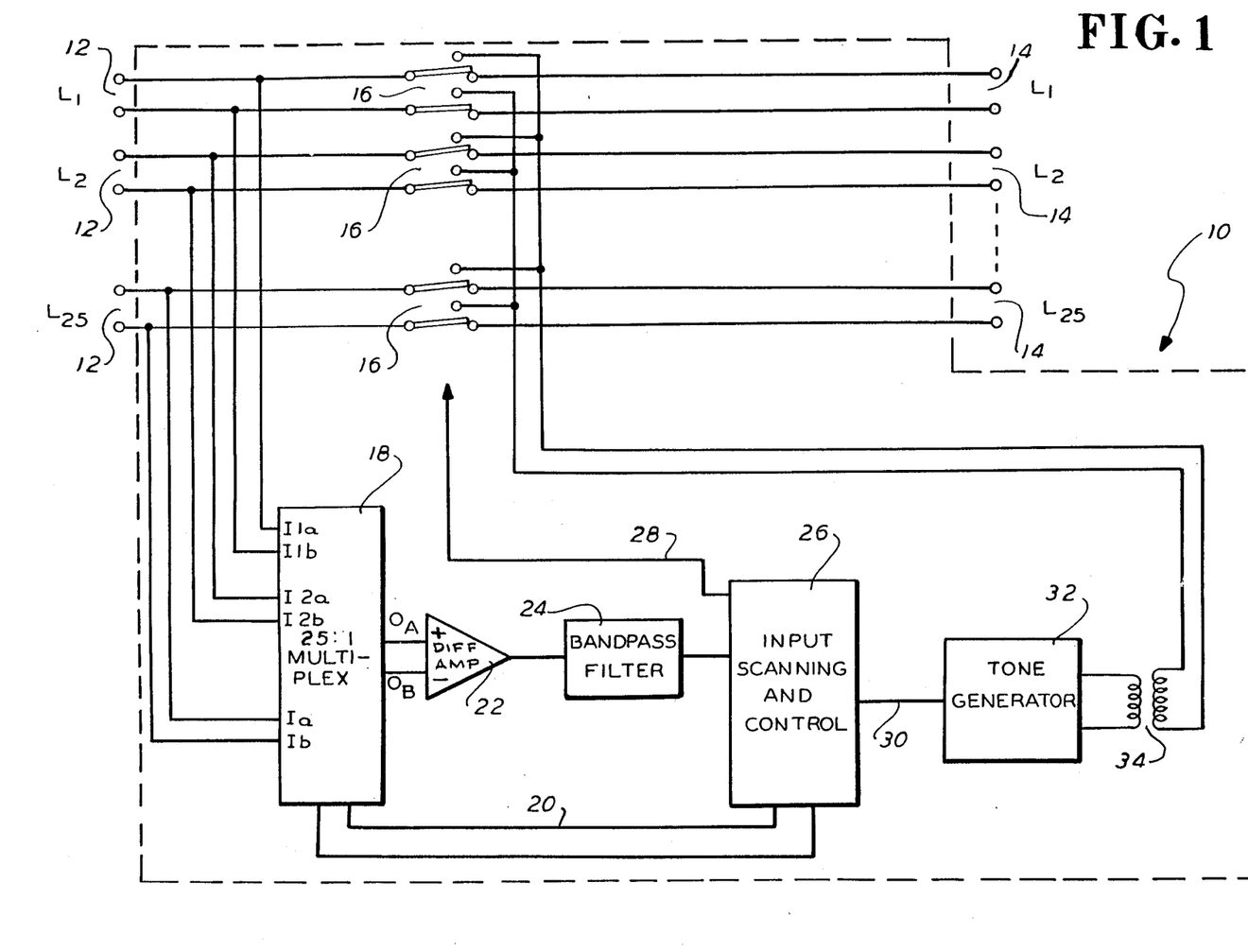
FIG. 1 is a block diagram depicting the components of a preferred embodiment of the invention.

FIG. 1 schematically depicts a preferred embodiment 10 of the present invention. Typically, the device is contained in an enclosure 11, as shown, and the module is mounted at a line termination point. An input/output means connects each incoming line pair to a respective subscriber line. In the embodiment shown, input terminals 12 are connected to 25 incoming lines $L_1$-$L_{25}$, accomodating a conventional 25-line termination block. Each terminal includes two contacts, relating to the tip and ring lines of normal equipment. (In conventional usage, as followed herein, the term "line" includes the tip and ring lines of a line pair). Although the conventional 25-line arrangement is shown, the module could be configured to handle other numbers. Thus, each input terminal 12 is connected to the telephone company central office.

Output terminals 14 are connected to subscriber equipment by conventional lines (not shown). Each input terminal also is connected to a corresponding output terminal through a double-pole, double-throw relay 16. Such relays may be conventional devices known to the art, and are connected such that in their normal position the output and input terminals of a given line are interconnected.

At a point between the input terminal and the relay, each line also is connected to a means for selecting an individual line as the evaluation line for test, such as multiplexer 18. Each line is provided two input ports, so that, for example, line $L_1$ is connected to input ports $I_1a$ and $I_1b$ and so forth, as shown. The multiplexer can be any of a number of devices known to the art, capable of receiving 25 paired inputs on input ports $I_1a$ and $I_1b$ through $I_{25}a$, and $I_{25}b$, and selecting one of those pairs of inputs as an evaluation line output on output terminals $0_a$ and $0_b$. Sequencing signals to select the input ports to be gated to the output ports are input via control bus 20. Although the multiplexer is shown as a single functional unit, those in the art will appreciate that several discrete components perform this function. In the embodiment shown, the multiplexer perferably comprises one 4052 module per four line pairs. The input impedance of this device is sufficiently high that no loading of the line occurs. Input ports can be accessed in any order desired, of course; in the illustrated embodiment, the preferred sequence is to step through the sequence $L_1$-$L_{25}$, as explained below.

The outputs from the multiplexer, consiting of signals from the evaluation line, are connected to the input terminals of differential amplifier 22. This device, which may be a conventional operational amplifier such as an LN 358, performs an initial filtering function, in that its output consists only of signals which appear on one side of the line, but not the other. Thus, a certain amount of line noise, etc., can be eliminated. As preferably connected, this device performs no amplification, but rather serves as an interface between the line and the remainder of the circuit.

The output of the differential amplifier is fed to the input of a filter means, bandpass filter 24. Preferably, this is a switched- capacitance type device, such as the model MF-5, manufactured by National Semiconductor Corp., selected for a frequency of 2713 hz. This component rejects the common mode noise generally present on a line.

Control and detection means 26 receives a filtered signal from the bandpass filter 24 as an input. Preferably, this device is a microprocessor, such as a type 8048, readily available to the art. Of course, other microprocessor devices could be incorporated into a circuit within the scope of this invention. Outputs from the control unit include sequencing signals fed to control bus 20, described previously, and a "commence test" signal output via control lines 28, connected to each relay 16. Also, a generator bus 30 connects the control unit to a tone generator 32. This generator can be any conventional device that generates tones in the general range 300-3000 hz, repsonsive to control signals applied on the generator control bus. The output tones of the generator are coupled to the normally-open terminals of relays 16. This coupling may be accomplished conveniently through a transformer 34, as will be appreciated.

This connection conveniently can be made to all of the normally-disconnected terminals in parallel, as only one such relay will be activated at a time, as explained in more detail below. Operation of the microprocessor takes place under the control of a program retained in the ROM (Read-Only Memory) portion of the microprocessor.

Figure 2:
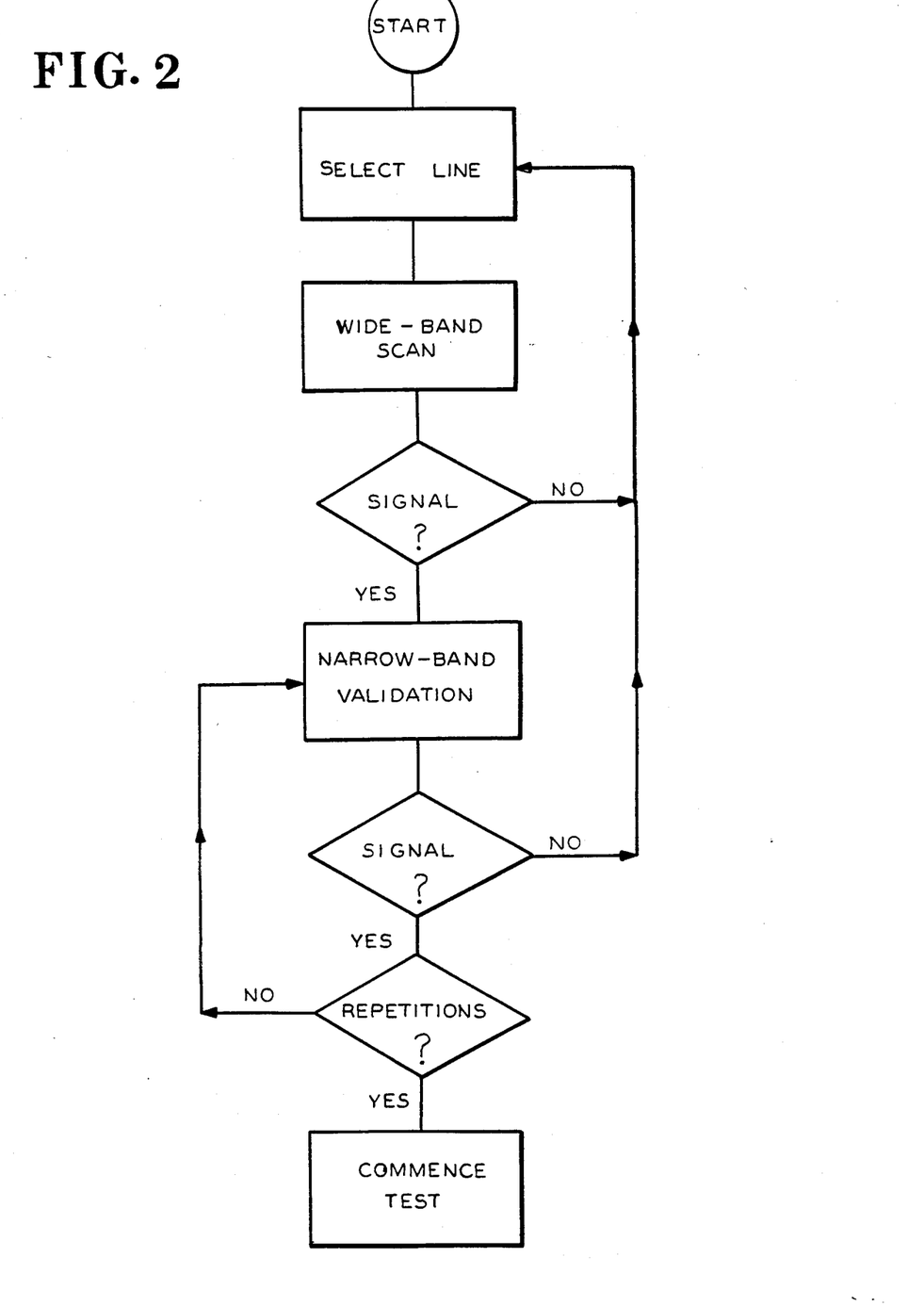
FIG. 2 is a flow chart depicting general operation of the embodiment shown in FIG. 1.

Before considering operation of this embodiment in detail, it will be helpful to consider operation of the present invention in a more general form, as shown in the flowchart of FIG. 2. It will be familiar to those in the art that conventional wisdom teaches that one must monitor a given line for at least four seconds, and preferably ten seconds, in order to detect and validate a check tone. This requirement stems from the fact that signals in many forms may be present on a given line, ranging from an on-going conversation, to crosstalk, to random transients. Therefore, before commencing line tests, it is important to insure that a signal received is in fact the check tone being transmitted by the central office. To date, the art's only solution to that problem has been to receive the signal for a significant period of time before validating the same as the check tone.

The present invention overcomes that problem by dividing the reception time into a number of discrete intervals and operating in two modes: an initial detection mode and a validation mode. As shown in FIG. 2, after selecting a line, the system performs an initial detection. In this step, the system determines whether any signal is present within the general frequency range of the check tone, before taking the time necessary to validate that the detected signal is in fact the check tone. It has been found that a range of ±100 hz for the initial detection band yields acceptable results for such a scan. Because accuracy of digital frequency measurement is directly dependent upon the measurement duration, this operation can be performed in a very short time interval, in the millisecond range. A scanning time of 25 ms has been found effective for this step.

If no signal is found during the initial detection mode, the system can proceed to select a new evaluation line by directing a sequencing signal from the microprocessor to multiplexer 18, moving rapidly from one line to another when no signals are present. A settling time for the bandpass filter, typically about 10 ms, must be allowed after selecting a new line. Thus, the total time required to perform this initial scan is 35 ms.

When a signal is detected, the system switches to a validation mode. Here, the objective is to identify a check tone positively, so a narrower validation band is employed. The industry standard of accuracy in tone identification is ±10 hz, but it has been found that the present invention can achieve significantly more accurate frequency measurement than required by that mandate. It remains true that some time must be expended in the validation step to insure that the detected signal is in fact the check tone, but the present invention has revealed that spurious signals tend to disappear well inside this time period. Therefore, the present invention divides the validation step into a number of relatively short repetitions, which may be termed "long time intervals" in comparison with the "short time intervals" used in the initial detection mode.

Combining the requirements for signal duration and those of accuracy, it is preferred to conduct validation in 0.5 second intervals, that being sufficient to achieve an accuracy of about ±1 hz. Six repetitions of this frequency measurement step are conducted, and that number has been found to produce consistent and accurate identification results. If the signal disappears after any one of these intervals, the system reverts to the initial detection mode, returning to the "select line" step. Thus, the present invention scans a large number of lines in a very short time, entering validation mode only when a signal is present during initial detection.

Figure 3:
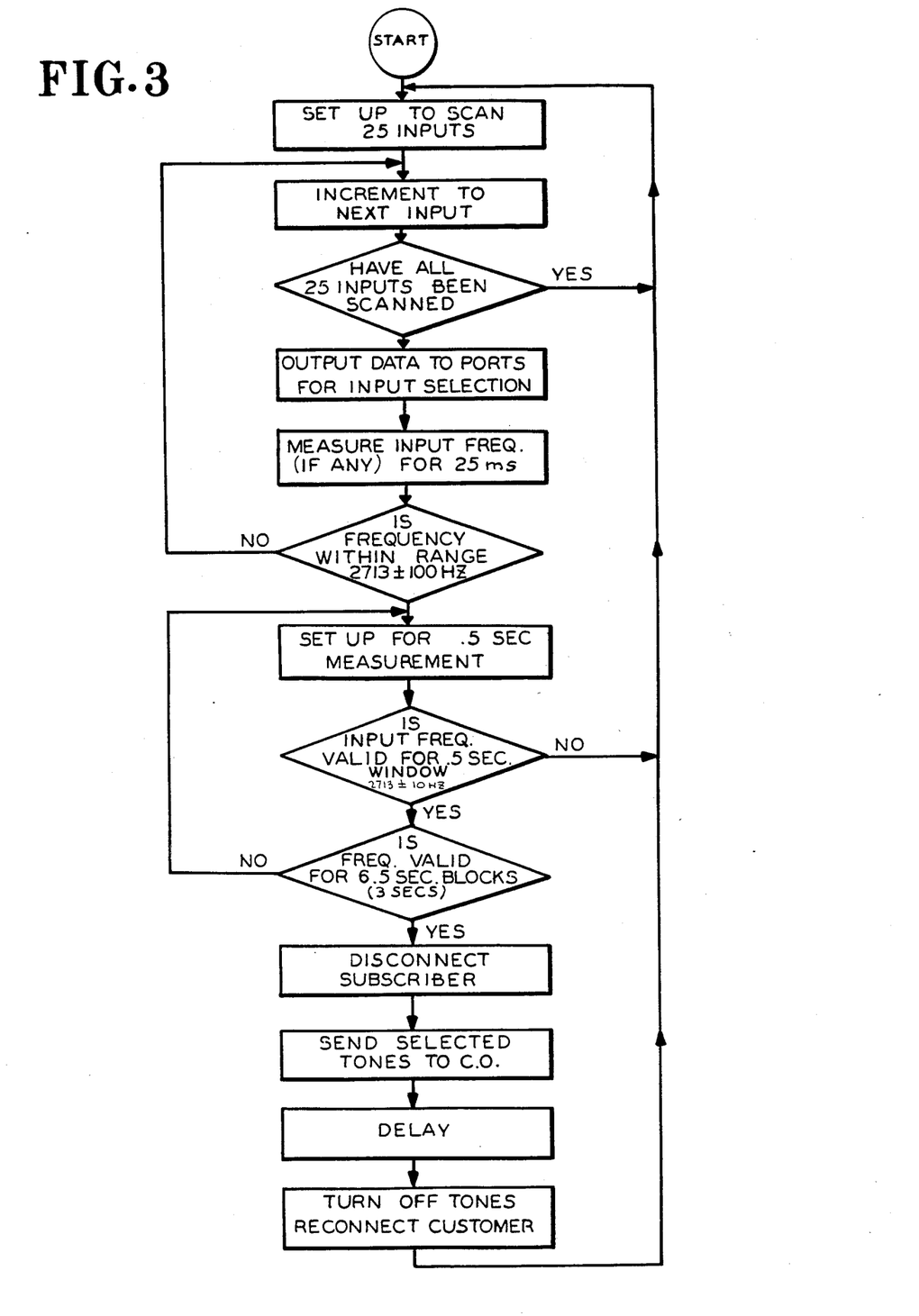
FIG. 3 is a flow chart depicting detailed operation of the embodiment shown in FIG. 1.

A more detailed understanding of the operation of the embodiment shown in FIG. 1 can be gained from the flowchart of FIG. 3, showing in greater detail the operational steps of the frequency measuring program stored in microprocessor 26. The module shown is adapted to detect a check tone of 2713 hz, a frequency often used by the industry for such testing. The system could, of course, be adapted to any chosen frequency. As shown, the unit commences operation by an initialization step, in which the system is configured to scan 25 inputs sequentially. An evaluation line is selected when the microprocessor outputs the appropriate codes to the multiplexer 18 on the control bus 20, as seen in FIG. 1. The system then pauses for 10 ms to allow the differential amplifier and bandpass filter to settle. Then, the microprocessor 26 measures the input frequency of any signal present for 25 ms. If no frequency is detected, the routine returns and increments to the next input.

If, however, a signal is detected, the system moves into the validation mode, looking for a signal of 2713±10 hz in 0.5 second increments. The program performs six iterations of this measurement, and if no signal is found after any of these increments, the routine loops back to begin the scan anew.

When the system does validate the detected signal as the check tone, it moves into a testing mode. First, a "commence test" signal on the appropriate control line 29 disconnects the telephone line from the subscriber line, establishing connection with the tone generator 32. Then, the microprocessor directs the tone generator through a testing sequence incorporated in the program. Such test sequences are well-known in the art, and need not be discussed in detail here. For example, the system could send a 1010 hz tone for 48 seconds, remain quiet for a period such as about 5 minutes, and then send another 1010 hz tone for 5 seconds. Another sequence might use a variety of tones, such as a 1010 hz tone for 20 seconds, followed by a 404 hz tone for 20 seconds, a 2804 hz tone for 20 seconds, a quiet term of 5 minutes, and finally a 1010 hz tone for 5 seconds. A single test sequence can be provided, or users can be offered a choice among several sequences, selectable, for example, by a dip switch. Other capabilities, such as providing for termination of the testing upon transmission of a tone from the central office, will be evident to those in the art.

Figure 4:
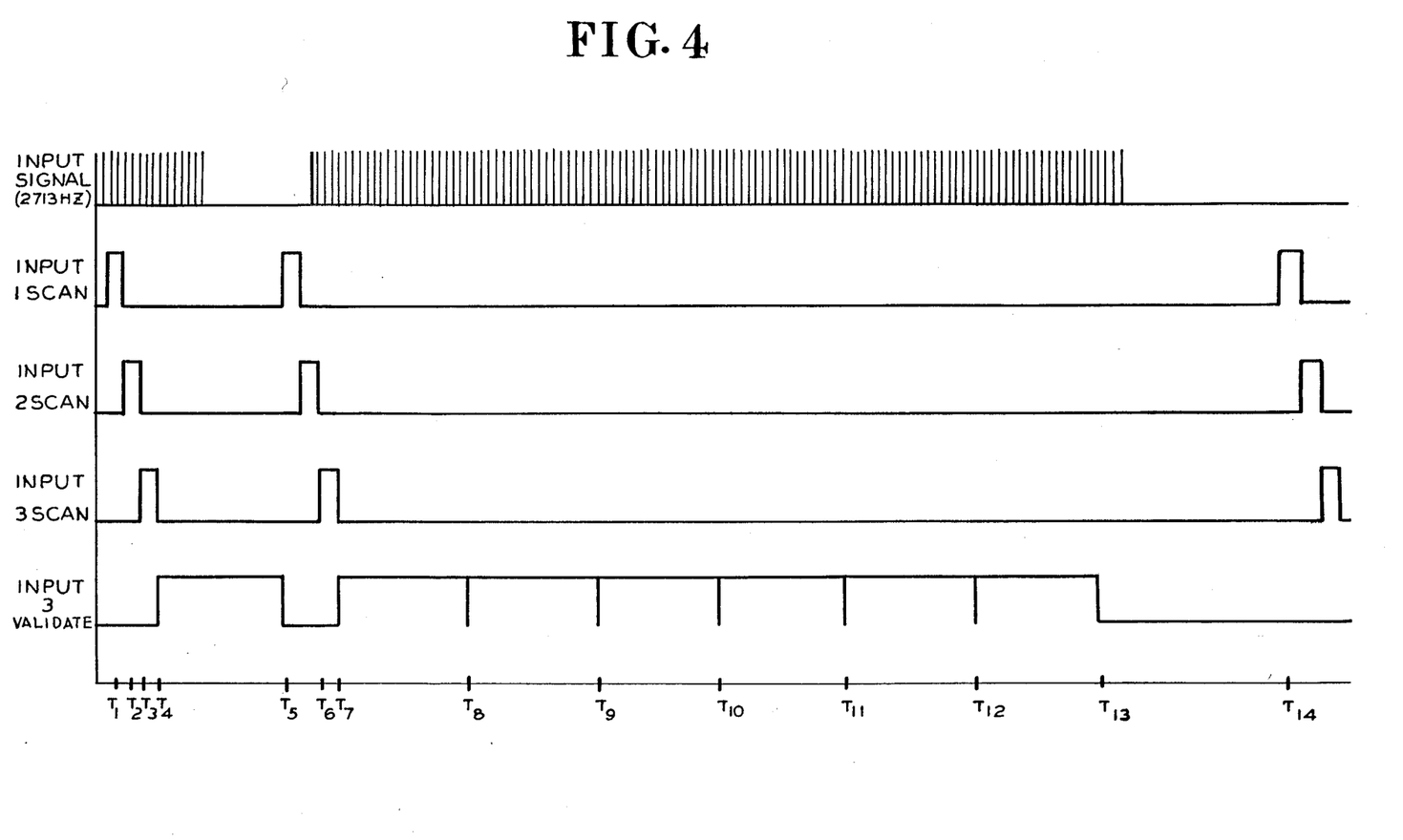
FIG. 4 is a graphic depiction of the system in operation in accordance with the operational steps of the flow chart of FIG. 3.

An example of the system in operation pursuant to the frequency measuring method is shown graphically in FIG. 4. Of course, the time line shown is not drawn to scale, given the disparity in the intervals shown. Also, it should be noted that only three input lines are included in the figure, for purposes of clarity. The top line shows the check tone of 2713 hz. being transmitted by the central office on line $L_3$, with a short interruption during the period T4–T5. As discussed, the module begins initial detection by scanning the first input line ($L_1$) and then increments the number of the line being scanned. At T1, the system scans line $L_1$, for a total of 35 ms (10 ms setting time and 25 ms scan time). Seeing no applied signal is found, the system moves on to line $L_2$ (T2), where again no signal is found. On line $L_3$, however, a signal within the bandwidth 2713 hz±100 hz is detected (T3), so the unit begins the validation mode, at point T4. During the first 0.5 second period, however, the signal disappears (as shown on the top line). The validation having failed, the system returns to the initial detection mode, starting with line $L_1$. From T5 to T7 the process repeats, with a signal again being detected on line $L_3$. Again the system tries to validate the signal as the check tone, and on this occasion, the signal remains present at each of the periods marked by T8-T13. The microprocessor thus decides that the signal is the check tone, and disconnects line $L_3$ from the subscriber and performs the test cycle, as described. At T14, the testing completed, the system returns to the "scan" mode.

This embodiment can scan a large number of lines and identify a check tone very rapidly. Taking the most difficult case, that of a check tone present on line $L_{25}$, this embodiment would identify that line and commence testing in 3.875 seconds—that is, 25 ms scan time plus 10 ms settling time per line, plus the 3 second validation period. The prior art would require preferably 250 seconds to perform this operation, and the minimum stated time for same is 100 seconds. Manifestly, this invention offers significant improvements over test apparatus heretofore available.

Figure 5:
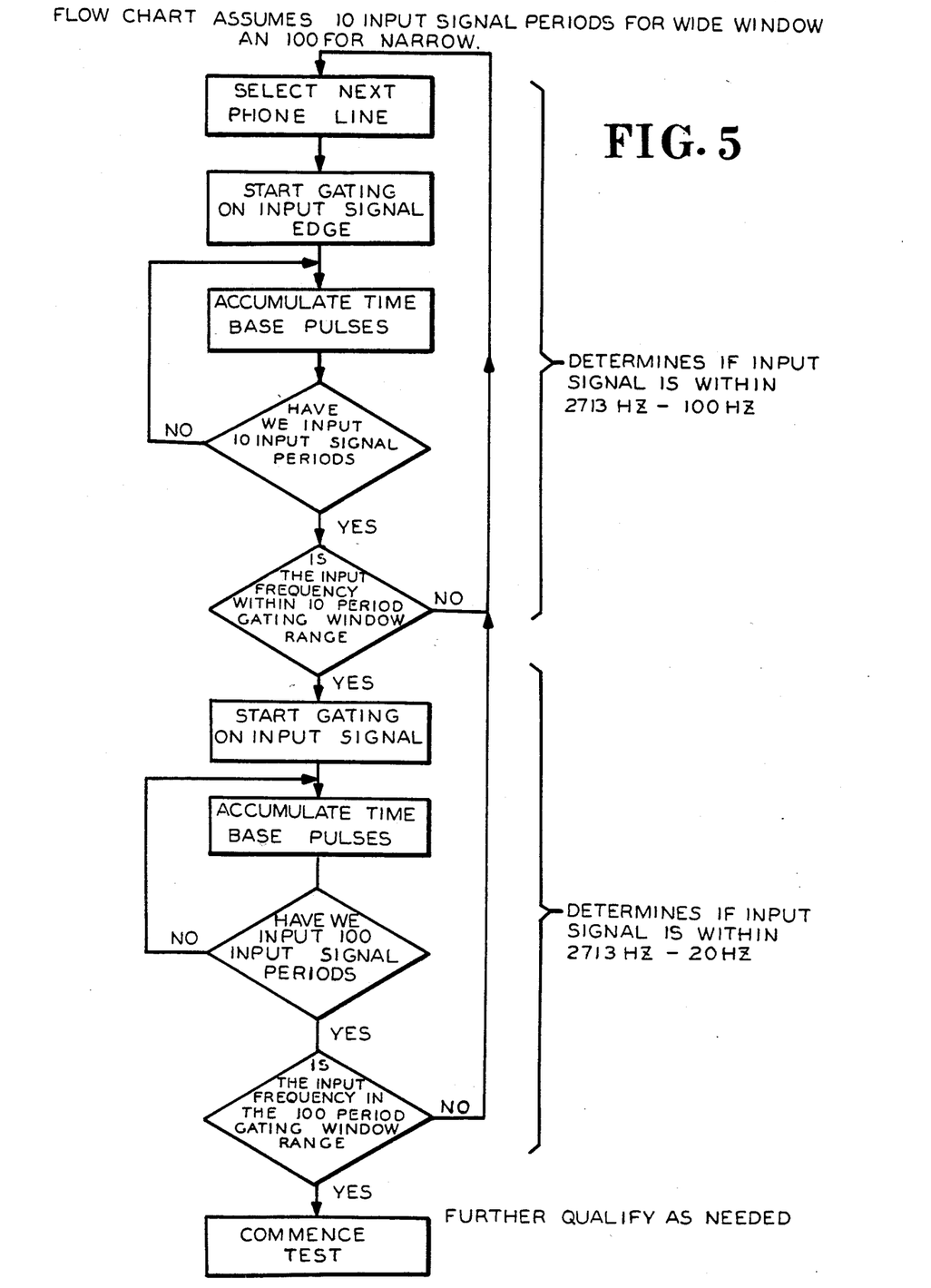
FIG. 5 is a flow chart depicting detailed operation of the embodiment shown in FIG. 1 pursuant to the alternative period measuring approach of the invention.

Referring now to FIG. 5, a flow chart is shown depicting a detailed illustration of the operational steps of the program stored in microprocessor 26 for detecting and validating a check tone pursuant to the alternative period measuring approach. As in the previous frequency measuring program, the microprocessor 26 is adapted to detect the typical industry check tone having a frequency of 2713 hz. The following discussion is with respect to a check tone of 2713 hz, however it should be understood that the system could be adapted to any chosen frequency. As shown in FIG. 5, the system selects a line from a sequence of lines to be scanned and starts gating a software generated 80 $\mu$sec time base pulse output upon detection of an input signal edge. If no input signal edge is detected within a preselected time period, the microprocessor 26 scans to the next line and so on until an input signal edge is detected. After the gating of the time base pulse output, the microprocessor 26 counts and accumulates the number of pulses until the period of 10 input signal periods has elapsed.

Pursuant to the preferred embodiment of the invention, an 80 $\mu$ sec time base is selected to provide a practical pulse count operation for the system vis-a-vis a standard 2713 hz check tone. Although an 80 $\mu$ sec. pulse is employed in the embodiment shown, those in the art will recognize that other time intervals can be chosen. The signal period for a signal at 2713 hz is equal to 368.6 $\mu$ sec which results in a gating window of 3.686 m sec to a 10 period gate. Accordingly, the microprocessor 26 will accumulate 46 80 $\mu$ sec pulses during a 10 period gating window of a 2713 hz signal. When using an 80 $\mu$ sec time base and 10 periods of a 2713 hz input signal, a measuring accuracy of 60 hz for each pulse count accumulated is obtained. Thus, a measuring window range of between 44 and 48 counts will detect a 2713 hz check tone to within an accuracy of approximately ±100 hz. If the microprocessor 26 has accumulated 44-48 counts during the 10 period count accumulation, a 2713 hz signal has been detected and the microprocessor 26 will continue onto a similar series of steps to validate the detected signal. Otherwise, the microprocessor 26 will return to the first step and increment to the next line.

In the series of steps to validate the detected signal, the period measuring approach is essentially repeated, however, for a 100 period gating window to improve the
g accuracy of the microprocessor 26. Indeed, a 100 period gating window decrease the measuring resolution from 60 hz per accumulated count to 6 hz. During a 100 period gate, 36.86 m sec will elapse and 460 pulse will be accumulated. With the improved accuracy, the microprocessor 26 validates the frequency of the detected signal to within a bandpass accuracy of approximately ±20 hz. If the signal is validated as the 2713 check tone, the microprocessor 26 goes on to test the line pursuant to the four test steps of the flow chart of FIG. 3 as described above. Otherwise, the microprocessor 26 will again return to the first step and incrementally scan the lines.

Figure 6:
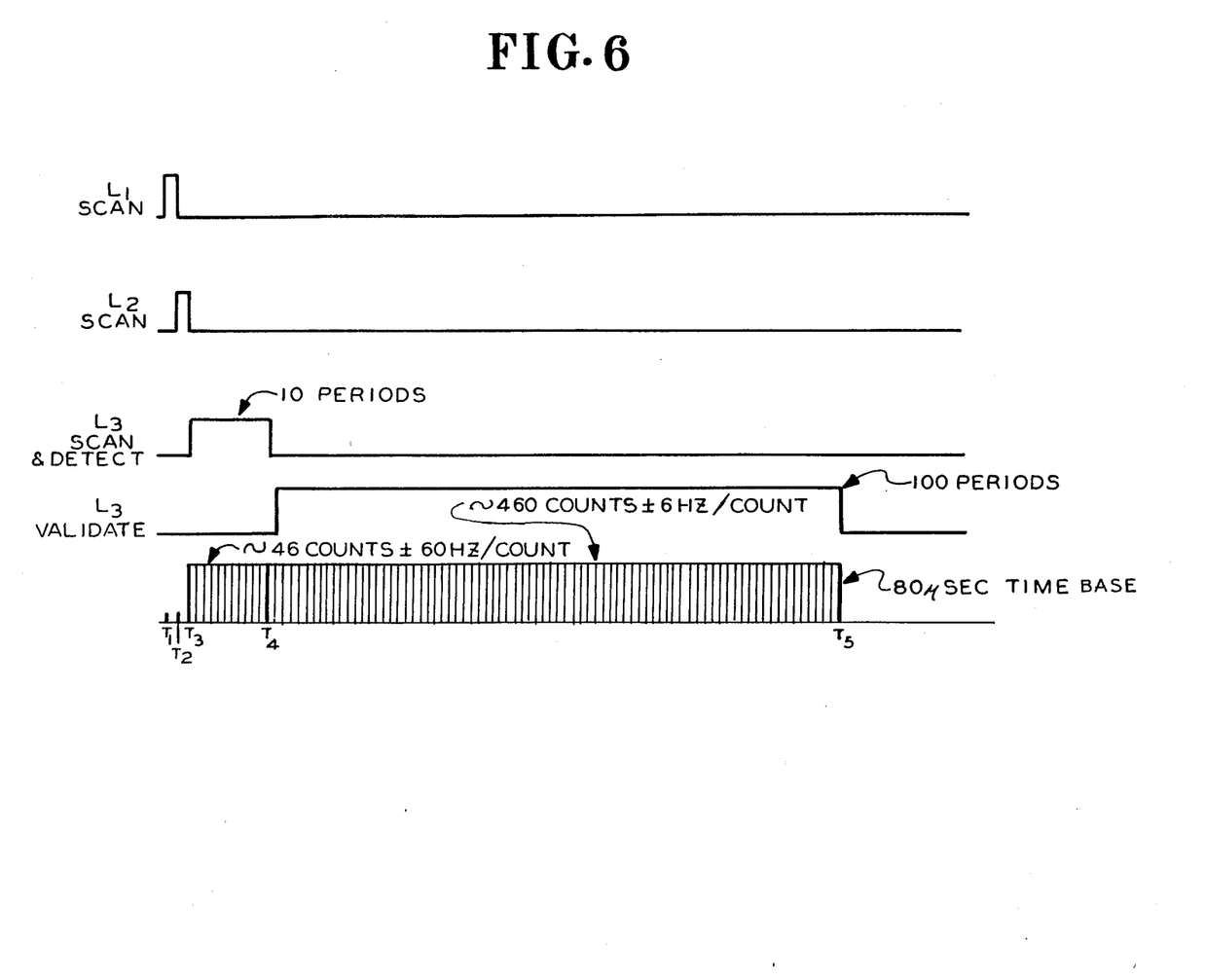
FIG. 6 is a graphic depiction of the system in operation in accordance with the operational steps of the flow chart of FIG. 5.

An example of the system is operation pursuant to the period measuring method is shown graphically in FIG. 6. As with respect to FIG. 4, the time line shown is not drawn to scale due to the disparity in the intervals shown and the example relates to only three inputs for clarity. Assume the central offices transmits a check tone of 2713 hz on line $L_3$. The microprocessor 26 begins by scanning lines $L_1$ and $L_2$, and each for a preselected time interval T1-T2 and T2-T3 respectively, to detect the edge of a signal. The preselected signal edge detection time may be of very short duration in that one period of a 2713 hz frequency is only 368.6 $\mu$ sec. Thus, the microprocessor 26 need not scan the line for very long before a signal edge is either detected or not detected. Inasmuch as there is no signal on either lines $L_1$ or $L_2$, the microprocessor 26 increments from lines $L_1$ and $L_2$ to line $L_3$ On line $L_3$ the leading edge of the 2713 hz check tone is detected and the microprocessor 26 enters a detection mode by gating on the software generated 80 $\mu$ sec time base pulse source for a period T3-T4 equal to 10 periods of the check tone. The accumulation of counts will be between 44-48 and, accordingly, the microprocessor 26 commences the validation mode at point T4 by gating on the pulse source for a period until T5 equal to 100 periods of the check tone. The microprocessor 26 will then confirm the 2713 hz check tone and disconnect the line $L_3$ from the subscriber for testing, as described above. In the event the 2713 hz signal is interrupted during the validation mode, as discussed with respect to the frequency measuring approach illustrated in FIG. 4, the microprocessor will not accumulate a sufficient number of counts to validate a signal and will initiate the first step to again incrementaly scan the lines one at a time for detection of a signal edge.

An important advantage of the period measuring embodiment of the invention is the considerable increase in the speed of testing. For example, the detection mode continues for 10 periods of the signal, which in the case of a 2713 hz check time, equals approximately 3.6 m sec. This represents a nearly 10 to 1 increase in speed relative to the 35 m sec detection time required to detect a 2713 hz frequency in the frequency measuring embodiment of the invention. Likewise, a similar speed increase is realized in the validation mode in that a 100 period time span for a 2713 by frequency equals 36.8 m sec as compared to the six 0.5 sec validation iterations of the frequency measuring approach, totalling 3.0 sec. The period measuring approach is idealy suited for testing applications which are either time critical or require the scanning of a large number of lines.

It will be appreciated by those in the art that various modifications to the system can be made. For example, other components could be substituted for the multiplexer and control unit to provide for fewer or more lines, as desired. These and other modifications can be accomplished within the scope of the present invention, which is defined solely by the claims appended hereto.

I claim:

1. A method for identifying and isolating a selected telephone line from amoung a plurality of telephone lines at a location remote from the central office, comprising the steps of:

transmitting a signal on the selecting telephone line from the central office, at a preselected frequency;

monitoring the input signal from one selected line of the plurality;

filtering said input signal to reject signals outside a preselected frequency band;

monitoring the frequency of said input signal during a first time interval to determine a frequency measurement within a preselected initial detection band within said frequency band, to detect a signal within said initial detection band by the steps of:

detecting the leading edge of said input signals;

activating a time base generator upon detection of said leading edge;

deactivating said time base pulse generator upon a first preselected number of periods of the frequency of said input signal;

accumulating the pulses generated by said time base pulse generator during said first preselected number of periods; and determining said frequency measurement within said preselected initial detection band from the number of pulses accumulated during said accumulating step;

incrementing said sequence and returning to said monitoring the input step if no signal is detected within said initial detection band;

continuing to monitor the frequency of said input signal during a second time interval, said second time interval being longer than said first time interval, to determine a frequency measurement within a preselected validation band within said initial detection band, to detect a signal therein in instances in which a said detected signal is detected during said monitoring step;

looping back to said incrementing step if no signal is detected within said validation band; and isolating the selected line from the subscriber equipment if a signal is detected within said validation band.

2. The method of claim 1, further characterized by said continuing to monitor step comprising the steps of:

detecting the leading edge of said input signal;

activiting a time base pulse generator upon detection of said leading edge;

deactiviating said time base pulse generator upon a second preselected number of periods of frequency of said input signal, said second preselected number of periods being greater than said first preselected number of periods;

accumulating the pulses generated by said time base pulse generator during said second preselected number of periods; and determining said frequency measurement within said validation band from the number of pulses accumulated during said next preceding accumulating step.

3. The method of claim 1 or 2, wherein said preselected frequency in 2713 hz and said time base pulse generator has time base of 80 $\mu$ sec.

4. The method of claim 2, wherein said first preselected number of periods in 10.

5. The method of claim 2, wherein said second preselected number of periods in 100.

6. Apparatus for indentifying and isolating a selected telephone line from among a plurality of telephone lines at a location remote from the central office, upon the application of a test signal to the selected line, comprising:

input/output means coupling each line of the plurality of lines to a respective subscriber line;

line selection means coupled to said input/output means, for selecting an evaluation line in a preselected sequence from among the plurality of lines in response to an input sequencing signal, and providing signals from said evaluation line as an evaluation output;

filter means coupled to said line selection means for filtering said evaluation output within a preselected wide frequency band and providing a filtered signal output;

control and detection means coupled to said filter means, operational in an initial detection mode for detecting the presence of an initial detection signal in an initial detection band within said wide frequency band during a first time interval and, upon detection of said initial detection signal, operational in a validation mode for detecting the presence of as validated test signal by detecting the presence of a validation signal lying in a validation band within said initial detection band during a second time interval, said second time interval being longer than said first time interval, for providing as an output a "commence test" signal upon detection of said validated test signal or a said input sequencing signal upon failure to detect a said initial detection signal during said initial detection mode or said validation signal during said validataion mode, said control and detection means is operational in said initial detection mode to detect a leading edge of saisd initial detection signal, to activate a time base pulse generator upon detection of said leading edge, to deactivate said time base pulse generator upon a first preselected number of periods of the frequency of said initial detection signal, to accumulate the pulses generated by said time base pulse generator during said first preselected number of periods and to detect the presence of said initial detection signal within said intial detection band from the number of pulses accumulated during said first preselected number of periods of the frequency of said initial detection signal; and isolation means coupled to said control and detection means and to said input/output means, for disconnecting said evaluation line from said respective subscriber line in response to said "commence test" signal.

7. The apparatus of claim 6, wherein said control and detection means is operational in said validation mode to detect a leading edge of said validation signal, to activate a time base pulse generator upon detection of said leading edge, to deactivate said time base pulse generator upon a second preselected number of periods of the frequency of said validation signal, wherein said second preselected number of periods is greater than said first preselected number of periods, to accumulate the pulses generated by said time base pulse generator during said second preselected number of periods and to detect the presence of said validation signal within said validation band from the number of pulses accumulated during said second preselected number of periods of the frequency of said validation signal.

8. The apparatus of claims 6 or 7, wherein the frequency of the test signal in about 2713 hz, and the time base of said time base pulse generator in about 80 μ sec.

9. The apparatus of claim 6, wherein said first preselected number of period is 10.

10. The apparatus of claim 7, wherein said second preselected number of periods is 100.

* * * * *

UNITED STATES PATENT AND TRADEMARK OFFICE
CERTIFICATE OF CORRECTION

PATENT NO. : 4,788,710

DATED : November 29, 1988

INVENTOR(S) : Daniel Lynch

It is certified that error appears in the above-identified patent and that said Letters Patent is hereby corrected as shown below:

Column 1, line 31, "3,427, 538" should be --3,427,538--.
Column 2, line 68, "oscilator" should be --oscillator--.
Column 3, line 5, "inversly" should be --inversely--; line 14, "oscilator" should be --oscillator--; line 34, "then" should be --than--.

Column 4, line 34, "consiting" should be --consisting--; line 64, "repsonsive" should be --responsive--.

Column 6, line 4, "intitial" should be --initial--

Column 7, line 56, "m" should be --µ--.

Column 8, lines 6-7, "the ... g" should be --the measuring-- line 10, "m" should be --µ--; line 20, "is" should be --in--; line 25, "transmits" should be --transmit--; line 36, $L_3$ (first occurrence) should be --$L_3$.--; line 53, "aly" should be --ally--; line 60, "m" should be -- --; line 61, "m" should be --µ--; line 66, "m" should be --µ--.

Column 9, line 1, "idealy" should be --ideally-- line 13, "amoung" should be --among--; line 16, "selecting" should be --selected--; line 27, "signals" should be --signal--; line 59, "activiting" should be --activating--; line 61, "deactiviating" should be --deactivating--.

Column 10, line 6, "in" should be --is--; line 10, "in" should be --is--; line 11, "indentifying" should be --identifying--; line 35, "is" should be --a--; line 45, "aion" should be --ation--; line 47, "saisd" should be --said--; line 55, "intial" should be --initial--.

UNITED STATES PATENT AND TRADEMARK OFFICE
CERTIFICATE OF CORRECTION

PATENT NO. : 4,788,710

DATED : November 29, 1988

INVENTOR(S) : Daniel Lynch

It is certified that error appears in the above-identified patent and that said Letters Patent is hereby corrected as shown below:

Column 12, lines 4 and 5, "in" should be --is--.

Signed and Sealed this

Eleventh Day of July, 1989

Attest:

DONALD J. QUIGG

Attesting Officer

Commissioner of Patents and Trademarks